United States Patent [19]

Tsurushima et al.

[11] 3,885,099

[45] May 20, 1975

[54] INTEGRATED LOGIC CIRCUIT FOR THE DECODER OF A MULTI-CHANNEL STEREO APPARATUS

[75] Inventors: Katsuaki Tsurushima, Kawasaki; Yoshio Ota, Fujisawa; Masashi Takeda, Isehara, all of Japan

[73] Assignee: Sony Corporation, Tokyo, Japan

[22] Filed: Nov. 29, 1973

[21] Appl. No.: 419,933

[30] Foreign Application Priority Data

Dec. 1, 1972 Japan ............................ 47-121039

[52] U.S. Cl. ..................... 179/1 GQ; 179/100.4 ST

[51] Int. Cl. ............................................. H04r 5/00

[58] Field of Search ............... 179/1 GQ, 100.4 ST; 330/30 D

[56] References Cited

UNITED STATES PATENTS

| | | | |
|---|---|---|---|
| 3,710,146 | 1/1973 | Ohsawa | 330/30 D |
| 3,764,925 | 10/1973 | Kool | 330/30 D |
| 3,798,373 | 3/1974 | Bauer | 179/100.4 ST |

*Primary Examiner*—Kathleen H. Claffy
*Assistant Examiner*—Thomas D'Amico
*Attorney, Agent, or Firm*—Lewis H. Eslinger; Alvin Sinderbrand

[57] ABSTRACT

A logic circuit which is easily and relatively inexpensively produced as an integrated circuit for use with the decoder of a multi-channel stereo apparatus of the type which converts two composite signals $L_T$ and $R_T$ into four output signals containing dominant signal components $L_F'$,$R_F'$,$L_B'$, respectively, with each of the output signals further including subdominant signal components as crosstalk. The logic circuit includes a plurality of full wave rectifiers for separately rectifying each of the four output signals, a first differential amplifier for producing a signal representative of the difference between the rectified $L_F'$ and $R_F'$ output signals and a second differential amplifier for producing an output signal representative of the difference between the rectified $L_B'$ and $R_B'$ output signals. The difference signal outputs are compared in a third differential amplifier which generates first and second control signals of opposite polarity which are each representative of the difference between the difference signal outputs. These control signals may be employed to control respective gain control amplifiers interposed in four output signals transmitting lines so as to depress the crosstalk.

9 Claims, 13 Drawing Figures

INTEGRATED LOGIC CIRCUIT FOR THE DECODER OF A MULTI-CHANNEL STEREO APPARATUS

BACKGROUND OF THE INVENTION

1. FIELD OF THE INVENTION

This invention relates generally to multi-channel stereo apparatus, and more particularly is directed to an improved logic circuit for use with the decoder of a multi-channel stereo apparatus of the type which converts or decodes two composite signals into four output signals containing respective dominant signal components and subdominant signal components as crosstalk.

2. DESCRIPTION OF THE PRIOR ART

A so-called matrix, four channel stereo system has heretofore been proposed in which four original sound signals (which, for convenience, are identified as $L_F$,$L_B$,$R_F$ and $R_B$ for "left front," "left back," "right front" and "right back," respectively) are converted into signals of only two channels by matrix networks called encoders for transmission or recording on conventional two channel media such as FM multiplex transmission or magnetic tape recording. In order to reproduce the encoded signals from the two channel media, they are decoded to four signals by matrix networks which are called decoders.

It is preferred that the original sound signals $L_F$,$L_B$, $R_F$ and $R_B$ be reproduced only from respective separate loudspeakers. However, with such matrix four channel stereo systems, each of the four output signals from the decoder contains a respective dominant signal component and also subdominant signal components. Thus, for each sound signal being reproduced by one of the loudspeakers, another sound signal is being reproduced by another of the loudspeakers at the same time in the form of crosstalk which is undesirable in that it detracts from the sense of separation of the reproduced signals.

It has been proposed to eliminate this undesirable crosstalk by the use of logic circuits. One type of such a logic circuit is referred to as "wavematching logic." The basis of wavematching logic is that the signals which are reproduced at opposite ends of the room from individual corner signals are equal in amplitude and are in quadrature with respect to each other. The wavematching logic recognizes this condition and makes the judgment that a pair of equal signals, when exactly at 90° with respect to each other and when present at only one end of the room, represent transferred signals which should be attenuated. By selecting appropriate junctions of the decoder matrix, the quadrature relationship is changed to one defining an in-or out-of-phase condition which is more easily identified than the quadrature relationship. One problem with this sort of circuit is that the wavematching logic must be connected to the internal circuitry of the decoder and cannot be solely connected to the input or output terminals of the decoder.

In recent years it has been the practice to try to design such decoders to be easily manufacturable as integrated circuits. The use of such wavematching logic circuits, however, requires that extra terminals must be provided on the integrated circuit decoder. The cost of the integrated circuit is more or less directly proportional to the number of terminals required and thus the use of those prior art wavematching logic circuits which require extra terminals in the integrated circuit decoder increase its cost.

One prior art integrated circuit, wavematching logic circuit which attempts to remedy this disadvantage is described in an article entitled "Discrete vs. SQ Matrix Quadraphonic Disc," published in the July 1972 issue of Audio at pp. 18–26. In the wavematching logic circuit described with reference to FIG. 10 of that article, the inputs to the logic circuit are obtained from the outputs of the decoder and used to control the gains of variable gaim amplifiers separately connected to the outputs of the decoder. However, such wavematching logic circuit does not produce an output control signal to attenuate the output signals from the decoder when there is present a center front or a center back signal, and it is necessary to provide additional logic circuits, known as front-back logic circuits, to permit these locations to be recognized. An example of such a front-back logic circuit is described in a C.B.S. Laboratories paper "SQ Logic Decoder—Theory of Operation," by R.G. Allen and B.B. Bauer, dated May 1, 1972. In response to a center front ($C_F$) signal, for example, to simultaneously increase the gains of the amplifiers of the left and right front signals ($L_F$ and $R_F$) and at the same time attenuate the $C_F$ signal which is also present in the rear sound signal channels without also attenuating the dominant $L_B$ and $R_B$ signals in the rear sound signal channels.

In the copending U.S. Patent Application, Ser. No. 367,886, filed June 7, 1973, by Katsuaki Tsurushima, one of the present inventors, and having a common assignee herewith, it is proposed to avoid many of the above disadvantages with a wavematching logic circuit and a front-back logic circuit for use with a four channel stereo decoder of the type which converts the two composite signals $L_T$ and $R_T$ into four output signals containing dominant signal components $L_F'$, $R_F'$, $L_B'$ and $R_B'$, respectively, with each of the output signals further including subdominant signal components as crosstalk. In the wavematching logic circuit, a plurality of full wave rectifiers separately rectifying the four decoding output signals, a first subtracting circuit produces a signal representative of the difference between the rectified $L_F'$ and $R_F'$ output signals and a second subtracting circuit produces an output signal representative of the difference between the rectified $L_B'$ and $R_B'$ output signals. A comparator generates first and second control signals of opposite polarity which are each representative of the difference between the difference signal outputs.

In the front-back logic circuit, the $L_F'$ and $R_F'$ decoding output signals are also supplied to a summing means and to a differencing means whose outputs are separately full wave rectified and applied to a second comparator which produces third and fourth control signals of opposite polarity. The third control signal is added to the first control signal and applied to control the gains of first and second variable amplifiers which transmit the $L_F'$ and the $R_F'$ output signals from the decoder to respective loudspeakers, and the fourth control signal is added to the second control signal and applied to control the gains of third and fourth variable gain amplifiers which transmit the $L_B'$ and $R_B'$ output signals from the decoder to respective loudspeakers. The third and the fourth output signals from the front-back logic circuit also respectively control two semiconductive mixing means which are connected between the outputs of the first and second variable amplifiers and between the outputs of the third and fourth variable amplifiers, respectively.

However, in practice, the existing circuitry of the above described wavematching and front-back logic circuits requires large numbers of electronic elements, such as, transistors, diodes, resistors and capacitors so that the resulting logic circuits for association with the decoder are necessarily expensive. Further, in producing these logic circuits, the very numerous electronic elements thereof have to be connected by hand, or at least selected so as to be free from variations. It is also necessary to test or adjust the complex logic circuits at many locations therein so as to ensure that the desired logic functions will be attained.

SUMMARY OF THE INVENTION

Accordingly, it is an object of this invention to provide a relatively simple logic circuit which is adapted to be easily and relatively inexpensively produced as an integrated circuit of substantially reduced size for use, for example, as a wavematching or front-back logic circuit, in association with the decoder of a multi-channel stereo apparatus.

More specifically, it is an object of this invention to provide a logic integrated circuit, as aforesaid, which employs a reduced number of electronic elements with relatively simple connections therebetween, and which minimizes the testing and adjustment required for its reliable performance of the desired logic operations.

Another object is to provide a logic integrated circuit, as aforesaid, which includes a plurality of transistors having their collectors in common so that the size of the integrated circuit can be reduced.

A further object is to provide logic integrated circuits, as aforesaid, which are capable of performing the desirable logic operations disclosed in U.S. Patent Application Ser. No. 367,886, which is identified more fully above.

A still further object is to provide a circuit arrangement, for example, in a logic integrated circuit, as aforesaid, in which a slice or clipping circuit in included in a differential amplifier for simplifying the circuit.

In accordance with an aspect of the invention, a logic circuit includes a plurality of full wave rectifiers for separately rectifying each of the four decoding output signals $L_F'$, $R_F'$, $L_B'$ and $R_B'$, a first differential amplifier for producing an output signal representative of the difference between the rectified $L_F'$ and $R_F'$ output signals, a second differential amplifier for producing an output signal representative of the difference between the rectified $L_B'$ and $R_B'$ output signals, and a third differential amplifier comparing the difference signal outputs of the first and second differential amplifiers and generating first and second control signals of opposite polarity which are each representative of the difference between the difference output signals, and which are employed to control respective gain control amplifiers interposed in four output signal transmitting lines for depressing crosstalk.

In the logic integrated circuit according to this invention, the first differential amplifier is constituted by first and second transistors having the rectified decoding output signals $L_F'$ and $R_F'$ applied to their respective bases, the second differential amplifier is constituted by third and fourth transistors having the rectified decoding output signals $L_B'$ and $R_B'$ applied to their respective bases, fifth, sixth, seventh and eighth transistors have their bases connected to the collectors of the first, second, third and fourth transistors, respectively, the collectors of the fifth and sixth transistors are connected to each other and to an output terminal for the first control signal, the collectors of the seventh and eighth transistors are connected to each other and to an output terminal for the second control signal, and means are provided for connecting together the emitters of the fifth, sixth, seventh and eighth transistors so that the latter constitute the third differential amplifier.

The above, and other objects, features and advantages of the invention, will be apparent in the following detailed description of an illustrative embodiment thereof which is to be read in connection with the accompanying drawings.

DESCRIPTION OF A PREFERRED EMBODIMENT

Figures 1, 13:
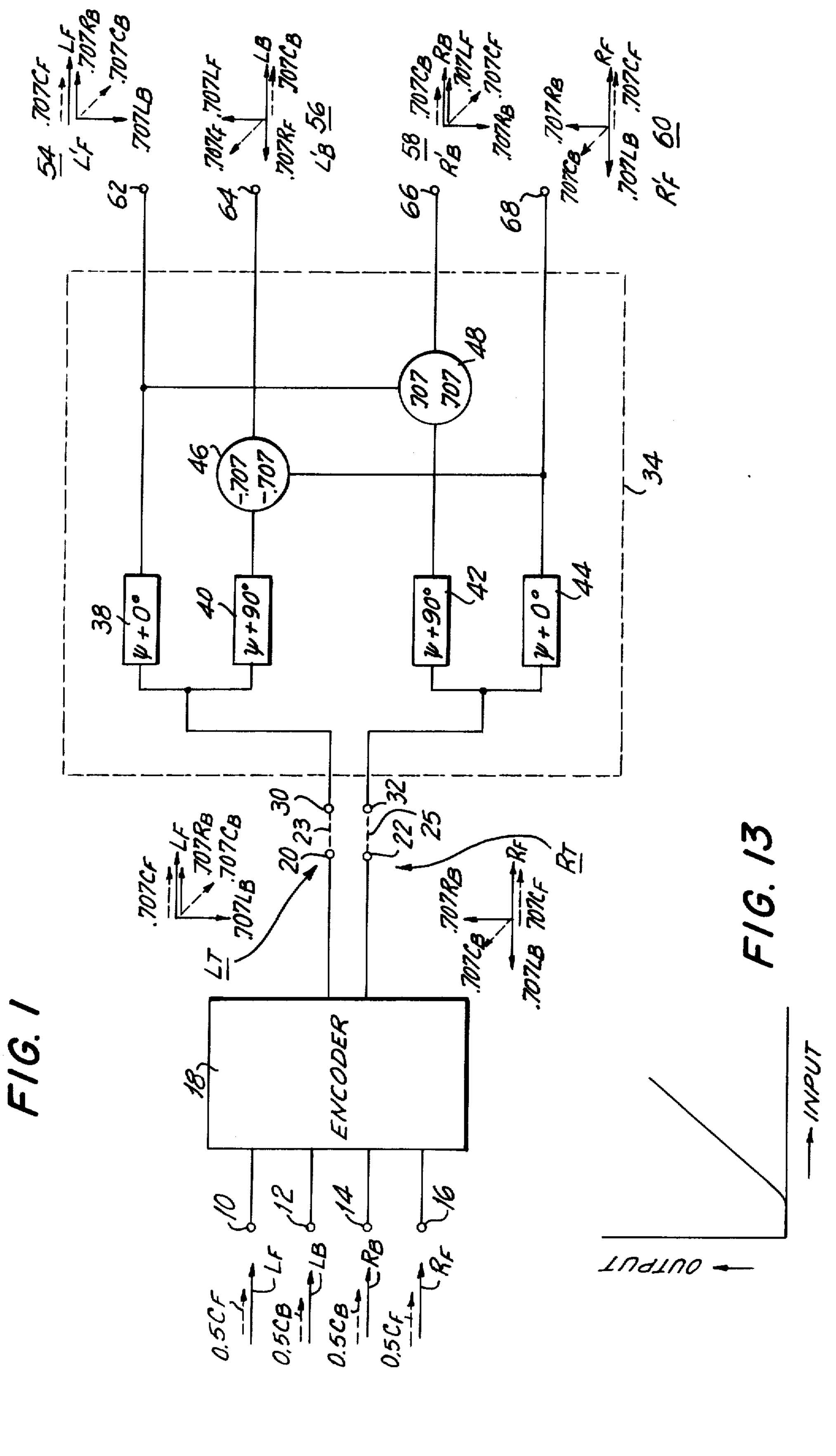
FIG. 1 is a schematic block diagram of the encoder and decoder of a multi-channel stereo apparatus of a type which this invention may be applied.
FIG. 13 is a graph showing the relation of the input to output in a slice or clipping circuit included in a logic circuit of FIG. 12.

Referring now to FIG. 1, it will be seen that a multichannel stereo apparatus of a type to which this invention may be applied is shown to include an encoder 18 which receives left front ($L_F$), left back ($L_B$), right back ($R_B$) and right front ($R_F$) signals at its input terminals 10, 12, 14 and 16, respectively. The encoder 18 also receives a 0.5 portion of a center front ($C_F$) signal at its input terminals 10 and 16 and a 0.5 portion of a center back ($C_B$) signal at its input terminals 12 and 14. The encoder transforms these input signals into two composite output signals designated $L_T$ and $R_T$ at its output terminals 20 and 22, respectively. The phasor components of these signals are represented by the phasor diagrams adjacent the respective terminals.

These composite signals may be characterized in complex notation as follows:

$$L_T = L_F - .707R_B + j\,(.707L_B)$$

$$R_T = R_F + .707L_B - j\,(.707R_B)$$

(when $C_F$ and $C_B$ are not present)

The encoded composite signals may thereafter be applied to any suitable two-channel medium as represented by channels 23 and 25, which may be, for example, the two surfaces of the V-shaped groove in a stereophonic record, a two-channel magnetic tape, or an FM multiplex radio channel.

Upon recovery from the two-channel medium the composite signals $L_T$ and $R_T$ are applied to two input terminals 30 and 32, respectively, of a decoder 34. The composite signals are then phase shifted with pairs of $\Psi$ networks 38 and 40 and 42 and 44 to position the phasor components of the composite signals relative to each other in a manner which favors selective addition and subtraction so as to derive four output signals, each containing a predominant component corresponding to one of the original input signals. The basic phase shift angle $\Psi$, which is introduced by the $\Psi$ networks, is a function of frequency.

Thus, the network 38 shifts the composite signal $L_T$ by the basic phase shift angle $\Psi$, the network 40 shifts the composite signal $L_T$ by a phase angle of $\Psi + 90°$, the network 42 shifts the composite signal $R_T$ by a phase angle of $\Psi + 90°$ and the network 44 shifts the composite signal $R_T$ by the basic phase angle $\Psi$. The output from the phase shifter 38 is supplied to an output terminal 62 and the output from the phase shifter 44 is applied to an output term nal 68. A .707 portion of the output of phase shifter 38 is added to .707 of the output from phase shifter 42 in a summing junction 48 and the resultant signal is applied to an output terminal 66 of decoder 34. Equal negative portions of the outputs of phase shifters 40 and 44, that is −.707 of the outputs of phase shifters 40 and 44, are combined in a summing junction 46 and the resultant signal is applied to the output terminal 64 of the decoder 34.

The first, second, third and fourth decoding output signals appearing at output terminals 62, 64, 66 and 68 of decoder 34 predeominantly contain the original signals $L_F$, $L_B$, $R_B$ and $R_F$, respectively, and various .707 magnitude (−3dB) components of the other signals as depicted by the phasor groups 54, 56, 58 and 60, respectively. These phasor groups have been designated $L_F'$, $L_B'$, $R_B'$ and $R_F'$, respectively.

Referring now more particularly to the schematic block diagram of FIG. 2, the audible reproduction of these signals by a circuit according to the invention will now be described. The signals appearing at output terminals 62, 68, 64 and 66 are applied to the inputs of gain control amplifiers 70, 76, 72, 74, respectively. The outputs from gain control amplifiers 70, 76, 72 and 74 are applied to full wave rectifying circuits 78, 80, 82 and 84, respectively. The purpose of the full wave rectifying circuits is to eliminate negative voltages so that a signal with a 180° phase difference is the equivalent of a 0° phase difference for symmetrical signals.

The output from full wave rectifier 80 is subtracted from the output of the full wave rectifier 78 in a differential amplifier 86. The difference signal output of differential amplifier 86 is applied to a full wave rectifier 90 through a time constant circuit 95. The output from full wave rectifier 90 is applied to a slice (or clipping) circuit 97. The output from slice circuit 97 is applied to the positive input terminal of a differential amplifier 94. The output from full wave rectifier 84 is subtracted from the output of full wave rectifier 82 in a differential amplifier 88. The difference signal output from differential amplifier 88 is applied to a full wave rectifier 92 through a time constant circuit 96.

The full wave rectified output from rectifier 92 is applied through a slice or slipping circuit 98 to the negative input terminal of amplifier 94. The outputs from full wave rectifiers 78, 80, 82 and 84 are combined in a summing junction 151 and the output signal from the latter is used to control the gains of variable gain amplifiers 70, 76, 72 and 74. The gain control amplifiers 70, 72, 74 and 76 are chosen to have identical or closely similar gain versus control characteristics.

The foregoing elements 70–98, inclusive, and 151 constitute a wave matching logic circuit A which generates a first control signal at the positive output terminal of differential amplifier 94 and this signal is applied through a time constant circuit 104 to a summing junction 106. A second control signal, of polarity opposite to that of the first control signal, is produced at the negative output terminal of differential amplifier 94 and this second control signal is applied through a second time constant circuit 114 to a summing junction 116. The output from junction 106 is applied through a limiter 108 to the gain control terminals of variable gain amplifiers 100 and 102. The inputs to the amplifiers 100 and 102 are the signals appearing at the output terminals 62 and 68, respectively, of decoder 34.

The second control signal is applied from junction 116 through a limiter 118 to the variable gain control terminals of variable gain control amplifiers 110 and 112. The inputs to the amplifiers 110 and 112 are derived from output terminals 64 and 66, respectively, of decoder 34. The outputs from the amplifiers 100, 102, 110 and 112 are supplied to speakers 120, 122, 124 and 126, respectively. These speakers are respectively located in the left front, right front, left back and right back corners of a listening area.

If it is assumed that the crosstalk components of $L_B$ and $R_B$ are not included in the output signals $L_F'$ and $R_F'$ appearing at output terminals 62 and 68, respectively, a signal which is either positive ($L_F$ exceeds $R_F$) or negative ($R_F$ exceeds $L_F$) appears at the output of differential amplifier 86. Because the center front signal ($C_F$) components in the $L_F'$ and the $R_F'$ signals are of the same phase and have the same amplitude they are cancelled in differential amplifier 86 and no center front signal appears at the output of differential amplifier 86.

Figure 5:
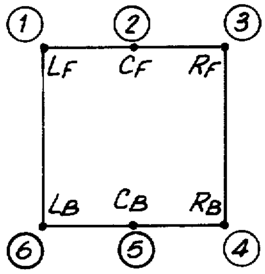
FIG. 5 is a diagrammatic illustration of the sound sources of the original sound field described in the specification.
Figure 6:
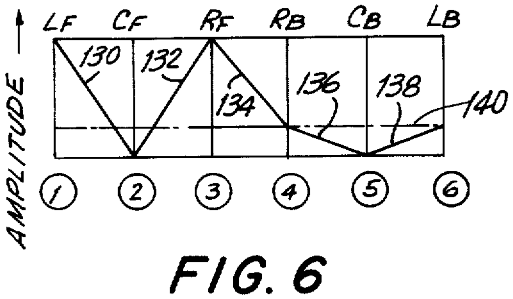
FIG. 6 is a diagrammatic illustration of the magnitude of the output signal from a rectifier in the logic circuits of FIG. 2 for variously located sound signal sources.

The difference signal from differential amplifier 86, after rectification by full wave rectifier 90, is a positive signal. Thus, if the sound signal originates at the left front ($L_F$) or (1) position shown on FIG. 5, a relatively large positive signal appears at the output of rectifier 90 (FIG. 6). If only a center front signal ($C_F$) predominates, that is, if the sound signal originates at the (2) position on FIG. 5, no signal appears at the output of rectifier 90. If the sound signal originates at the right front ($R_F$) or (3position on FIG. 5, a relatively large positive signal appears at the output of rectifier 90. Thus, it can be said that, when the origin of the sound is located between positions (1) and (2) (left front and center front), the control signal applied to the positive terminal of differential amplifier 94 varies on the line 130 on FIG. 6. When the origin of the sound is located between the (2) and (3) positions (center front and right front), the control signal varies on the line 132.

Figure 7:
FIG. 7 is a waveform diagram to which reference will be made in explaining the operation of the logic circuit according to the invention.

If, on the other hand, the left-front and right-front ($L_F$ and $R_F$) signals are not contained in the $L_F'$ and $R_F'$ signals and only the crosstalk components $L_B$ and $R_B$ are contained therein, only a small magnitude, positive signal appears at the output stage of rectifier 90. This small positive signal represents the difference between the $L_B$ components in the $L_F'$ and $R_F'$ signals which are 90° apart in phase. The combined $L_B$ signal, as depicted in FIG. 7, has a generally triangular-shaped waveform. A similar signal is generated by the differencing of the $R_B$, 90°-phase difference, subdominant signal components. Thus, referring again to FIGS. 5 and 6, when only the right-back signal ($R_B$) is generated at position (4), a small positive signal appears at the output of rectifier 90. When the sound originates at the center back ($C_B$) or (5) position, no output signal appears at rectifier 90 and, when the signal originates at the left back ($L_B$) or (6) position, a small positive signal again appears at the output of rectifier 90.

Figure 8:
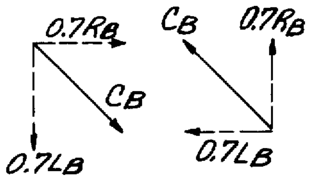
FIG. 8 depicts the phasor components of a center back signal to which reference will be made in the explanation of this invention.

Thus, it can be said that the phasor component $C_B$ is synthesized by the subdominant components of $R_B$ and $L_B$ in the $L_F'$ and $R_F'$ signals. However, these two synthesized $C_B$ signals are of the same amplitude and out of phase with each other (as illustrated in FIG. 8) so that they are cancelled in differential amplifier 86.

When the original signal is located between positions (3) and (4) (right front and right back), positions (4) and (5) (right back and center back), or positions (5) and (6) (center back and left back), the control signal appearing at the output stage of rectifier 90 varies on the curves defined by the lines 134, 136 or 138, respectively, on FIG. 6. Therefore, both the center front signal and the center back signal components contained in the $L_F'$ and $R_F'$ signals are cancelled in differential amplifier 86 and this feature is of importance in the operation of the logic circuit A.

Figure 9:
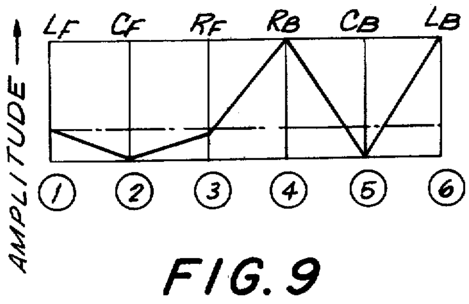
FIG. 9 is a diagrammatic illustration of the magnitude of the output signal from a rectifier in a logic circuit of FIG. 2 for variously located sound signal sources.

A result similar to that described above in respect to the signals $L_F'$ and $R_F'$ is obtained for the signals $L_B'$ and $R_B'$. The amplitude characteristic of the output signal appearing at the output of rectifier 92 is illustrated in FIG. 9. In a manner similar to that described above, the crosstalk components of the center front and center back signals ($C_F$ and $C_B$, respectively) contained in the $L_B'$ and $R_B'$ signals are cancelled in differential amplifier 88. Thus, when the signals are predominant only at the left front or right front positions, only a relatively small amount of positive control signal is produced at the output of rectifier 92.

By suitable selection of the time constants in time constant circuits 104 and 114, it is possible to reduce to zero this small voltage which is present when only the crosstalk components are contained in the signals $L_F'$, $R_F'$, $L_B'$ and $R_B'$. Furthermore, since the output signals from rectifiers 90 and 92 are applied to slice circuits 97 and 98, respectively, the slice or clipping levels may be selected (as represented by the line 140 on FIG. 6) to cancel out the subdominant signals. Thus, the input signal applied to the positive input of amplifier 94 represents the difference between the main component $L_F$ in the composite $L_F'$ signal and the main component $R_F$ in the $R_F'$ signal, that is:

$$\big|\,|L_F| - |R_F|\,\big|$$

Similarly, an input signal applied to the negative input terminal of amplifier 94, may be made by suitable selection of the slice level of slice circuit 98, to represent the difference between the main component $L_B$ in the $L_B'$ signal and the main component $R_B$ in the $R_B'$ signal or:

$$\big|\,|L_B| - |R_B|\,\big|$$

With these two input signals, the output signals at the positive and negative terminals of amplifier 94 may be designated:

$$\big|\,|L_F| - |R_F|\,\big| - \big|\,|L_B| - |R_B|\,\big|$$

These signals are then applied to gain control amplifiers 100, 102, 110 and 112, as described above. The two signals will have opposite polarities determined as follows: If the absolute value of the difference between $L_F$ and $R_F$ is larger than the absolute value of the difference between $L_B$ and $R_B$, namely if $$\big|\,|L_F| - |R_F|\,\big| > \big|\,|L_B| - |R_B|\,\big|,$$

then the polarity of the signal at the positve output terminal of amplifier 94 will be such as to increase the gains of amplifiers 100 and 102, and the polarity of the signal at the negative output terminal of amplifier 94 will be of the opposite polarity to correspondingly decrease the gains of amplifiers 110 and 112. Signals which would otherwise be reproduced by speakers 124 and 126 would therefore not be heard by the listener and crosstalk signal components $L_F$ and $R_F$ contained in the $L_B'$ and $R_B'$ signals are substantially eliminated. Similar results are obtained in the other channels. That is, if the absolute value of the difference between the $L_B$ and $R_B$ signal components is larger than the absolute value of the difference between the $L_F$ and $R_F$ signal components, that is, if $$\big|\,|L_B| - |R_B|\,\big| > \big|\,|L_F| - |R_F|\,\big|,$$

then an output signal is obtained at the negative output terminal of amplifier 94 which is of a polarity to increase the gains of amplifiers 110 and 112 and the control signal at the positive output terminal of amplifier 94 is of the opposite polarity to decrease the gains of amplifiers 100 and 102. This substantially eliminates the crosstalk component signals of $L_B$ and $R_B$ in the signals $L_F'$ and $R_F'$.

By way of reemphasizing the important features of the above-described wavematching logic circuit A, it is noted that, since the components $L_F$ and $R_F$ in the $L_F'$ and $R_F'$ signals, respectively, are in phase, the center front signals $C_F$ contained therein is cancelled in differential amplifier 86 and likewise, since the center back $C_B$ signals contained in the $L_F'$ and $R_F'$ signals are out-of-phase, they are also cancelled in differential amplifier 86 (because a phase difference of 180° appears as a phase difference of zero after full wave rectification). Similarly, the signal components $L_B$ and $R_B$ and the signals $L_B'$ and $R_B'$, respectively, are in phase so that the center back $C_B$ signal contained therein is cancelled in differential amplifier 88 as are the center front signals $C_F$ which are out-of-phase with each other and are contained therein. This makes it unnecessary to provide a time constant circuit or circuits between each of rectifiers 78 and 80 and differential amplifier 86 and between each of rectifiers 82 and 84 and differential amplifier 88.

Figure 10:
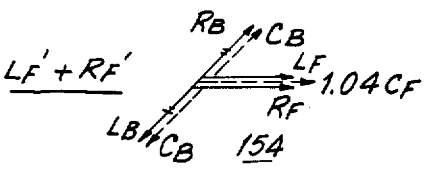
FIGS. 10 and 11 are phasor diagrams representative of the output signals from differential amplifiers of a logic circuit of FIG. 2.
Figure 11:
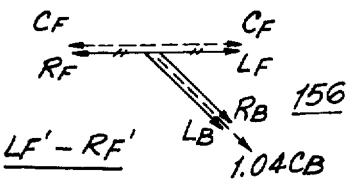

As explained above the wavematching logic circuit A will not produce an output control signal for the center front or the center back signals. Since the center front signal position is particularly popular for the placement of solo voices or instruments it is necessary to provide an additional, front-back logic circuit B which will recognize these locations. In the illustrated embodiment of the front-back logic circuit B, the output from amplifier 70, which represents the $L_F'$ signal, is supplied to a positive input terminal of a differential amplifier 150, and the output of amplifier 76, which represents the $R_F'$ signal, is supplied to a negative input terminal of differential amplifier 150 through a phase inverter 148 to produce a sum signal 154 as shown on FIG. 10. The $L_F'$ and $R_F'$ signals are also supplied to positive and negative input terminals, respectively, of a differential amplifier 152 to produce a difference signal 156, as shown on FIG. 11. The sum signal 154 is full wave rectified by a rectifier 158 and is integrated by a parallel RC circuit 162 before being applied to the positive input terminal of a differential amplifier 160. The difference signal 156 from differential amplifier 152 is full wave rectified by a rectifier 164 and is integrated by a parallel RC circuit 166 before being applied to the negative input terminal of differential amplifier 160. The RC circuits 162 and 166 act as time constant circuits.

The output signal from the positive terminal of amplifier 160 constitutes a third control signal which is added to the first control signal in summing junction 106, and also applied to the gate electrode of a field effect transistor (FET) 170 whose source and drain electrodes are connected between the outputs of amplifiers 110 and 112. The FET 170 acts as a mixer to mix the outputs of amplifiers 110 and 112 in response to the third control signal. The output signal derived at the negative output terminal of amplifier 160 constitutes a fourth control signal which is added to the second control signal in summing junction 116 and is also applied to the gate electrode of a field effect transistor 172 whose source and drain electrodes are connected between the outputs of amplifiers 100 and 102 so that the outputs of the latter are mixed in response to the fourth control signal.

It should be noted that in the sum signal 154 (FIG. 10), the $L_F$ and $R_F$ signal components are in phase but the $R_B$ and $L_B$ signals are out-of-phase. Therefore, a center-back signal $C_B$, if present, is cancelled in differential amplifier 150, but a center front signal, if present, will nevertheless be obtained. On the other hand, in the difference signal 156 (FIG. 11), the $L_F$ and $R_F$ signal components are out-of-phase but the $L_B$ and $R_B$ signal components are in phase so that if the center front signal is present, it is cancelled in differential amplifier 152 and the center back signal $C_B$, if present, is obtained.

Thus, if a center front signal is present, a third control signal of a polarity which will increase the gains of the amplifiers 100 and 102 appears at the positive output terminal of amplifier 160, if $$|L_F' + R_F'| - |L_F' - R_F'| > 0,$$

and this third control signal is applied by way of junction 106 to the gain control of the amplifiers 100 and 102 so as to increase their gains and increase the loudness of the sounds produced by left front and right front speakers 120 and 122, respectively. Furthermore, by application of the third control signal to the gate electrode of FET 170, the center front signals contained in the signal $L_B'$ and $R_B'$ are mixed and cancelled. A signal of the opposite polarity is developed at the negative output germinal of differential amplifier 160 which decreases the gains of amplifiers 110 and 112 and makes FET 172 essentially non-conductive.

If on the other hand, the center back signal is present, then a signal of a polarity which will increase the gains of amplifiers 110 and 112 appears at the negative output terminal of differential amplifier 160, and this fourth control signal causes the gain of amplifiers 110 and 112 to increase and the signal outputs from amplifiers 100 and 102 to be mixed so that the center back signals contained in the signals $L_F'$ and $R_F'$ are cancelled. A signal of the opposite polarity is developed at the positive output terminal of amplifier 160 which decreased the gains of amplifiers 100 and 102 and makes FET 170 essentially non-conductive.

Figure 2:
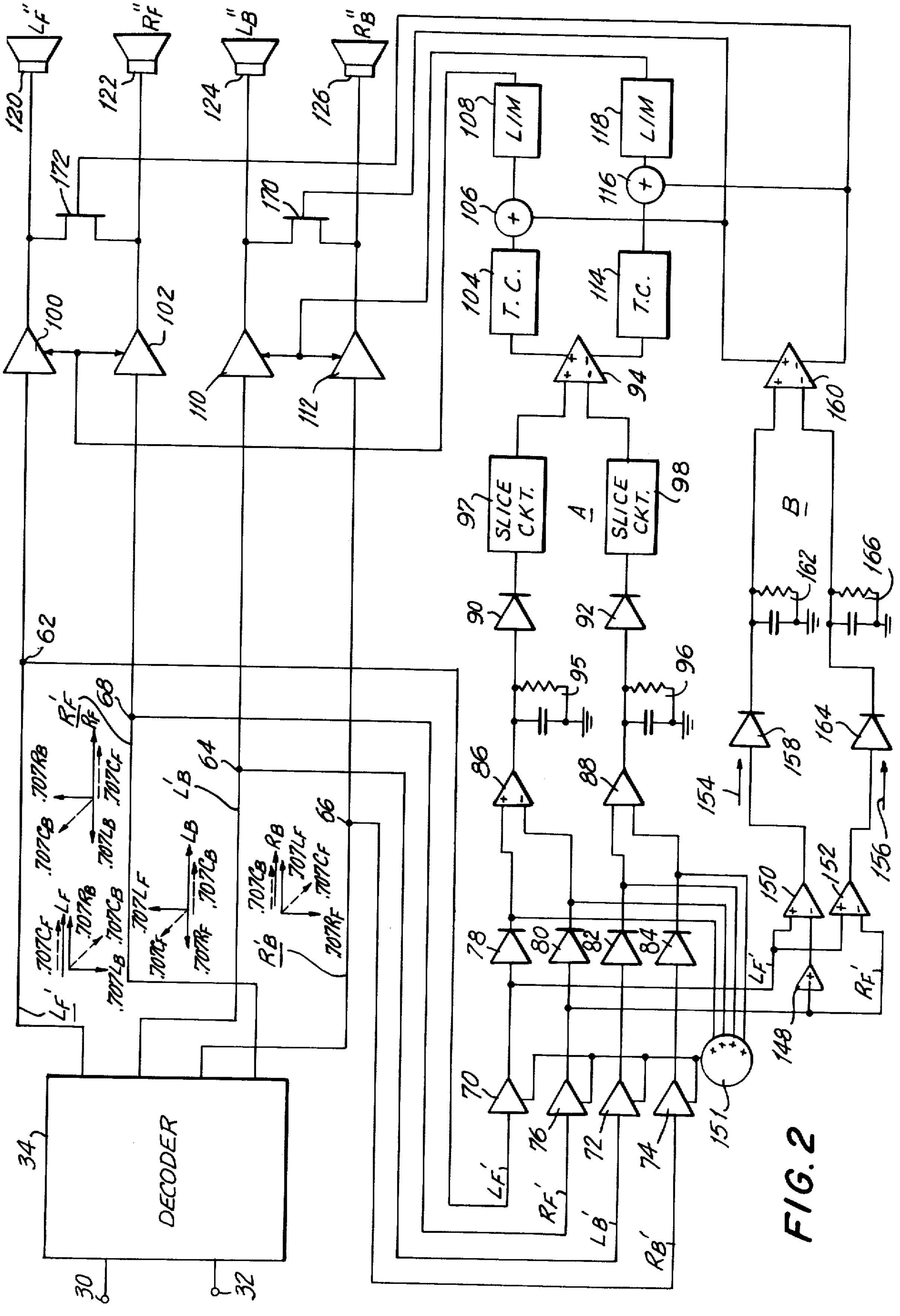
FIG. 2 is a schematic block diagram of logic circuits according to this invention associated with the decoder of FIG. 1.
Figure 3:
FIGS. 3 and 4 are waveform diagrams of output signals obtained from one of the differential amplifiers of FIG. 2.
Figure 4:
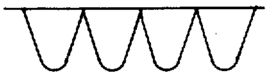

In the circuit arrangement of FIG. 2, the mixing FETS 170 and 172 connected to front-back logic circuit B eliminate center signals from the (back or front) channels in which they do not properly belong at the same time as the gains of the amplifiers in the proper (front or back) channels are increased and the gains of the amplifiers in the improper (back or front) channels are decreased. In contrast to some prior art front-back logic circuits, the signal mixing feature described above allows the reductions in the gains of the amplifiers in the improper channels to be less than in such prior art circuits so that the dominant signals are not also reduced to a sub-audible level.

Figure 12:
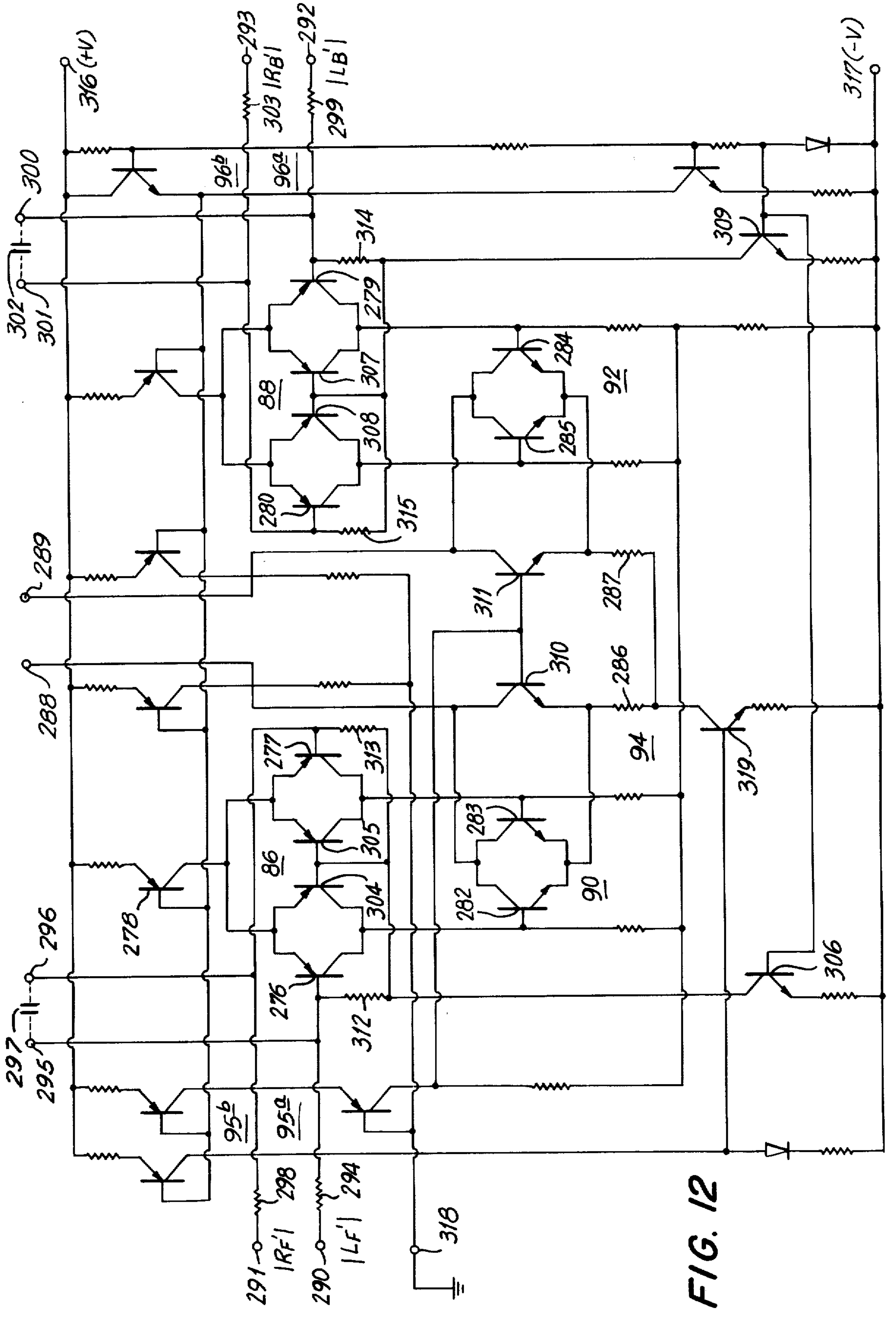
FIG. 12 is a circuit diagram showing details of logic circuit according to this invention.

Referring now to FIG. 12, it will be seen that, in an integrated circuit construction according to this invention of the portion of the wavematching logic circuit A that extends from differential amplifiers 86 and 88 through differential amplifier 94, the first differential amplifier 86 is constituted by first and second transistors 276 and 277 having their emitters connected to each other and to a constant current source which includes a transistor 278. The second differential amplifier 88 is similarly constituted by third and fourth transistors 279 and 280 having their emitters connected to each other and to a constant current source which includes a transistor 281. The full wave rectifier 90 associated with differential amplifier 86 is shown to be constituted by fifth and sixth transistors 282 and 283 having their bases respectively connected to the collectors of the first and second transistors 276 and 277. The collectors of transistors 282 and 283 are connected to each other, and the emitters of transistors 282 and 283 are also connected to each other. Similarly, the full wave rectifier 92 associated with differential amplifier 88 is constituted by seventh and eighth transistors 284 and 285 having their bases connected to the collectors of third and fourth transistors 279 and 280, respectively. The emitters of transistors 284 and 285 are connected to each other, and the collectors of transistors 284 and 285 are also connected to each other.

Resistors 286 and 287 are respectively connected, at one end, to the connected together emitters of transistors 282 and 283 and the connected together emitters of transistors 284 and 285, and the other ends of resistors 286 and 287 are connected to a constant current source constituted by a transistor 319. By reason of the foregoing, the fifth and sixth transistors 282 and 283 and the seventh and eighth transistors 284 and 285 are operative to differentially amplify, that is, such transistors 282-285 combine to constitute the differential amplifier 94 of wavematching logic circuit A.

First, second, third and fourth input terminals 290, 291, 292 and 293 which respectively receive the signals $L_F'$, $R_F'$, $L_B'$ and $R_B'$ from rectifiers 78, 80, 82 and 84 are connected to the bases of transistors 276, 277, 279 and 280, respectively. Output terminals 288 and 289 are connected to the connected together collectors of the fifth and sixth transistors 282 and 283, and to the connected together collectors of the seventh and eighth transistors 284 and 285, respectively, and such output terminals 288 and 289 correspond to the positive and negative output terminals of differential amplifier 94 which are shown on FIG. 2 to be connected to the time constant circuits 104 and 114, respectively.

The time constant circuits 95 and 96 of FIG. 2 are shown, in the integrated circuit construction of FIG. 12, to be provided at the input sides of differential amplifiers 86 and 88, respectively. More specifically, as shown, the time constant circuit 95 includes a first time constant circuit 95*a* consisting of a resistor 294 connected between input terminal 290 and the base of transistor 276 and a capacitor 297 connected between terminals 295 and 296 of the integrated circuit which are respectively connected the bases of transistors 276 and 277. The time constant circuit 95 further includes a second time constant circuit 95*b* which consists of a resistor 298 connected between input terminal 291 and the base of transistor 277 and the previously mentioned capacitor 297. The time constant circuit 96 similarly includes a first time constant circuit 96*a* consisting of a resistor 299 connected between input terminal 292 and the base of transistor 279 and a capacitor 302 connected between terminals 300 and 301 on the integrated circuit which are respectively connected to the bases of transistors 279 and 280. The time constant circuit 96 further includes a second time constant circuit 96*b* consisting of a resistor 303 connected between input terminal 293 and the base of transistor 280 and the previously mentioned capacitor 302.

In the integrated circuit according to this invention, as shown on FIG. 12, the slice circuits 97 and 98 of the wavematching logic circuit A of FIG. 2 are incorporated within the differential amplifiers 86 and 88, respectively. More specifically, as shown, slice transistors 304 and 305 are provided in differential amplifier 86 and have their respective emitters connected to the emitters of the first and second transistors 276 and 277, while the collectors of slice transistors 304 and 305 are connected to the collectors of first and second transistors 276 and 277, respectively. The bases of slice transistors 304 and 305 are connected to each other, and also connected to the bases of transistors 276 and 277 through resistors 312 and 313, respectively. Further, the bases of slice transistors 304 and 305 are connected to a constant current source which includes a transistor 306. A similar circuit arrangement is applied to the differential amplifier 88, that is, slice transistors 307 and 308 are included in differential amplifier 88 with their bases being connected to each other and also connected to the bases of the third and fourth transistors 279 and 280 through resistors 314 and 315, respectively. Further, the bases of slice transistors 307 and 308 are connected to a constant current source that includes a transistor 309. The emitters of slice transistors 307 and 308 are connected to the emitters of third and fourth transistors 279 and 280, respectively, and the collectors of transistors 307 and 308 are connected to the collectors of transistors 279 and 280, respectively. Further, the collector-emitter path of a slice transistor 310 is connected between the collectors and emitters of the fifth and sixth transistors 282 and 283 and, similarly, the collector-emitter path of a slice transistor 311 is connected between the collectors and emitters of the seventh and eighth transistors 284 and 285. The bases of slice transistors 310 and 311 are connected to each other and supplied with a predetermined bias voltage. The illustrated integrated circuit is further shown to have a positive voltage terminal 316, a negative voltage terminal 317, and a ground terminal 318.

The above described integrated circuit arrangement of wavematching logic circuit A operates as follows:

When the rectified decoding output signals $|L_F'|$, $|R_F'|$, $|L_B'|$ and $|R_B'|$ are supplied to input terminals 290, 291, 292 and 293, respectively, from full wave rectifiers 78, 80, 82 and 84, such rectified decoding output signals are smoothed by the time constant circuits 95*a*, 95*b*, 96*a* and 96*b*, respectively, and applied as direct current signals to the bases of first, second, third and fourth transistors 276, 277, 279 and 280, respectively. When a difference between rectified signals $|L_F'|$ and $|R_F'|$ is greater than a predetermined level, an output signal of $|R_F'| - |L_F'|$ appears at the collector of transistor 276, and therefore is applied to the base of transistor 282. Simultaneously, an output signal of $|L_F'| - |R_F'|$ appears at the collector of transistor 277 and, therefore, is applied to the base of transistor 283. Similarly, when the difference between the rectified decoding output signals $|L_B'|$ and $|R_B'|$ is greater than a predetermined level, an output signal of $|R_B'| - |L_B'|$ appears at the collector of transistor 279 and, therefore, is applied to the base of transistor 284, and, simultaneously, an output signal of $|L_B'| - |R_B'|$ appears at the collector of transistor 280 and, therefore, is applied to the base of transistor 285.

The above described output signals $|R_F'| - |L_F'|$ and $|L_F'| - |R_F'|$ are rectified by the base-emitter junctions of transistors 282 and 283 so that an output signal of $||L_F'| - |R_F'||$ which is an absolute value of the difference signal $|L_F'| - |R_F'|$, appears at the emitters of transistors 282 and 283. As a result of the foregoing, an amplified output signal of $||L_F'| - |R_F'||$ is obtained at the collectors of transistors 282 and 283. Similarly, an output signal $||L_B'| - |R_B'||$ appears at the emitters of transistors 284 and 285, so that an amplified output signal of $||L_B'| - |R_B'||$ is obtained at the collectors of transistors 284 and 285.

As described above with reference to the wavematching logic circuit A of FIG. 2, the full wave rectifying functions of transistors 282 and 283 and the slicing functions of transistors 304, 305 and 310, cause the amplified output signal appearing at the collectors of transistors 282 and 283 to be an absolute value of the difference between the main components $L_F$ and $R_F$, that is, $||L_F| - |R_F||$. Similarly, the amplified output signal appearing at the collectors of transistors 284 and 285 is an absolute value of the difference between the main signal components $L_B$ and $R_B$, that is, $||L_B| - |R_B||$. Since the transistors 282 and 283 and the transistors 284 and 285 are operative to differentially amplify that is, constitute the differential amplifier 94 of FIG. 2, an output signal $||L_B| - |R_B|| - ||L_F$ $| - | R_F ||$ appears at the collectors of transistors 282 and 283 and hence at the output terminal 288. Similarly, an output signal $||L_F| - |R_F|| - ||L_B| - |R_B||$ appears at the collectors of transistors 284 and 285, and hence at the output terminal 289.

In respect to the slicing or clipping function in the differential amplifier 86, it will be seen that, since transistors 276 and 277 are connected to the constant current source constituted by transistor 306 and in which the current flowing through the collector of transistor 306 is a constant, the potential of the bases of slice transistors 304 and 305 is lower than the potential of the bases of the first and second transistors 276 and 277. Therefore, if the value of the difference between the signals $|L_F'|$ and $|R_F'|$ is less than a predetermined value, the transistors 276 and 277 are turned OFF, and no output signal appears at the bases of transistors 282 and 283. However, if the value of the difference between the signals $|L_F'|$ and $|R_F'|$ is greater than the predetermined value, transistors 276 and 277 are turned ON, and the previously described output signals will appear at the bases of transistors 282 and 283. The slicing function is illustrated on FIG. 13 where "input" represents the difference between the signals $|L_F'|$ and $|R_F'|$ and "output" represents the level of the signal appearing at output terminal 288. A slicing function is similarly performed in differential amplifier 88 in respect to the level or value of the difference between signals $|L_B'|$ and $|R_B'|$. In the described integrated circuit, the level at which slicing occurs may be adjusted by varying the collector current flowing through the collector of the transistor 306 and of the transistor 309. The described circuit arrangement is further advantageous in that it may be adapted to slice a small signal.

Although the integrated circuit of FIG. 12 illustrates the application of this invention to the wavematching logic circuit A of FIG. 2, it will be understood that differential amplifiers 150 and 152, rectifiers 158 and 164, time constant circuits 162 and 166 and differential amplifier 160 of the back-front logic circuit B of FIG. 2 may be similarly formed as an integrated circuit.

In the integrated circuit according to this invention, for example, as shown on FIG. 12, the pairs of transistors 276 and 304, 277 and 305, 279 and 307, 280 and 308, 282 and 283, and 284 and 285 are preferably formed with respective common collectors so as to simplify the integration of the circuit and to reduce the collector areas of such circuit so that the overall dimensions of the integrated circuit are correspondingly reduced. Further, since the transistors 282–285 perform the functions of rectifiers 90 and 92 and also of differential amplifier 94 of logic circuit A, the resulting integrated circuit is further simplified and reduced in size.

Although an illustrative embodiment of this invention has been described in detail herein with reference to the accompanying drawings, it is to be understood that the invention is not limited to that precise embodiment, and that various changes and modifications may be effected therein by one skilled in the art without departing from the scope or spirit of the invention, as defined in the appended claims.

What is claimed is:

1. In a multi-channel stereo apparatus which has decoder means for decoding two composite signals into at least first, second, third and fourth decoding output signals each containing a dominant signal component and at least one subdominant signal component, logic means for detecting the dominant signal component contained in each of said decoding output signals and producing first and second control signals, and variable transmission means for varying the transmitting conditions for said decoding output signals in response to said control signals; said logic means being in the form of an integrated circuit comprising first, second, third, fourth, fifth, sixth, seventh and eighth transistors each having a base, emitter and collector, said first and second transistors constituting a first differential amplifier, said third and fourth transistors constituting a second different amplifier, means for applying said first, second, third and fourth decoding output signals to the bases of said first, second, third and fourth transistors, respectively, the bases of said fifth, sixth, seventh and eighth transistors being respectively connected to the collectors of said first, second, third and fourth transistors, the collectors of said fifth and sixth transistors being connected to each other and to a first output terminal, the collectors of said seventh and eighth transistors being connected to each other and to a second output terminal, and means for connecting together the emitters of said fifth, sixth, seventh and eighth transistors so that said fifth, sixth, seventh and eighth transistors constitute a third differential amplifier and said first and second control signals are respectively obtained at said first and second output terminals.

2. In a multi-channel stereo apparatus, an integrated circuit logic means as in claim 1; further comprising first and second slice means connected to said first and second differential amplifiers, respectively, so that the transistors of the respective differential amplifier are turned ON only when the differences between the first and second decoding output signals and between the third and fourth decoding output signals exceed a predetermined value.

3. In a multi-channel stereo apparatus, an integrated circuit logic means as in claim 2; in which each of said first and second slice means includes first and second transistors, and a constant current source connected to the base of said first and second transistors of the respective slice means; and in which the emitters and collectors of said first and second transistors of said first slice means are connected to the emitters and collectors of said first and second transistors, respectively, of said first differential amplifier, and the emitters and collectors of said first and second transistors of said second slice means are connected to the emitters and collectors of said third and fourth transistors, respectively, of the second differential amplifier.

4. In a multi-channel stereo apparatus, an integrated circuit logic means as in claim 3; further comprising third slice means connected with said third differential amplifier.

5. In a multi-channel stereo apparatus, an integrated circuit logic means as in claim 4; in which said third slice means includes first and second transistors each having a base, emitter and collector, the bases of said first and second transistors of said third slice means are connected to each other and receive a predetermined bias voltage, and the collectors and emitters of said first and second transistors of the third slice means are connected with the collectors and emitters, respectively, of said fifth and sixth transistors and of said seventh and eighth transistors, respectively.

6. In a multi-channel stereo apparatus, an integrated circuit logic means as in claim 1; further comprising slice means connected with said third differential amplifier.

7. In a multi-channel stereo apparatus, an integrated circuit logic means as in claim 6; in which said slice means includes first and second transistors each having a base, emitter and collector, the bases of said first and second transistors of the slice means are connected to each other and receive a predetermined bias voltage, and the collectors and emitters of said first and second transistors of the slice means are connected with the collectors and emitters, respectively, of said fifth and sixth transistors and of said seventh and eight transistors, respectively.

8. In a multi-channel stereo apparatus, an integrated circuit logic means as in claim 1; in which time constant circuits are connected with the bases of said first and second transistors constituting said first differential amplifier and with the bases of said third and fourth transistors constituting the second differential amplifier.

9. In a multi-channel stereo apparatus, an integrated circuit logic means as in claim 8; in which the time constant circuits include resistors respectively interposed in said means for applying the first, second, third and fourth decoding output signals to the bases of said first, second, third and fourth transistors, and capacitors respectively interposed between terminals connected to the bases of said first and second transistors and between terminals connected to said third and fourth transistors.

* * * * *